US008636566B2

(12) United States Patent
Gajina

(10) Patent No.: US 8,636,566 B2
(45) Date of Patent: Jan. 28, 2014

(54) CEILING-EMBEDDED AIR CONDITIONER

(75) Inventor: Kenji Gajina, Fuji (JP)

(73) Assignee: Toshiba Carrier Corporation, Tokyo (JP)

(*) Notice: Subject to any disclaimer, the term of this patent is extended or adjusted under 35 U.S.C. 154(b) by 0 days.

(21) Appl. No.: 12/676,589

(22) PCT Filed: Sep. 4, 2008

(86) PCT No.: PCT/JP2008/065961
§ 371 (c)(1),
(2), (4) Date: Mar. 4, 2010

(87) PCT Pub. No.: WO2009/031609
PCT Pub. Date: Mar. 12, 2009

(65) Prior Publication Data
US 2010/0201232 A1    Aug. 12, 2010

(30) Foreign Application Priority Data
Sep. 7, 2007   (JP) ................................. 2007-233132

(51) Int. Cl.
*F24F 7/00*   (2006.01)
(52) U.S. Cl.
USPC ......................................... 454/292; 248/27.3
(58) Field of Classification Search
USPC ......... 454/269, 275, 292, 293–304, 308, 309, 454/310, 311–321, 329, 331, 338, 426; 62/259.1, 263, 426; 248/27.3
See application file for complete search history.

(56) References Cited

U.S. PATENT DOCUMENTS

| 4,786,119 A * | 11/1988 | Smuda .......................... 312/195 |
| 4,877,364 A * | 10/1989 | Sorrentino .................... 411/337 |
| 5,425,674 A * | 6/1995 | Stach ............................ 454/370 |
| 5,577,958 A | 11/1996 | Kumekawa |
| 8,006,512 B2 * | 8/2011 | Sanagi et al. ................... 62/426 |
| 2002/0152760 A1 | 10/2002 | Okuda |
| 2006/0213216 A1 | 9/2006 | Sakashita |
| 2007/0111655 A1 * | 5/2007 | Song et al. .................... 454/292 |
| 2008/0217460 A1 * | 9/2008 | Shin .......................... 242/390.1 |
| 2009/0025414 A1 * | 1/2009 | Koga et al. ...................... 62/263 |
| 2009/0100851 A1 * | 4/2009 | Yabu et al. .................... 62/259.1 |
| 2010/0233952 A1 * | 9/2010 | Mavroudis et al. ........... 454/275 |

FOREIGN PATENT DOCUMENTS

| JP | 60-191814 |   | 9/1985 |
| JP | 61-006116 |   | 1/1986 |
| JP | 01054153 A | * | 3/1989 |
| JP | 02133739 A | * | 5/1990 |
| JP | 02176337 A | * | 7/1990 |
| JP | 3-6231 |   | 1/1991 |

(Continued)

OTHER PUBLICATIONS

English Language Abstract of JP 2005-249328, published Sep. 15, 2005.

(Continued)

*Primary Examiner* — Steven B McAllister
*Assistant Examiner* — Jamil Decker
(74) *Attorney, Agent, or Firm* — DLA Piper LLP (US)

(57) ABSTRACT

In a ceiling-embedded air conditioner, a panel fastening screw that fastens a decorative panel to an indoor unit body embedded in a ceiling is previously mounted to the indoor unit body and has an intermediate portion having a small diameter with no threaded portion.

2 Claims, 7 Drawing Sheets

(56) References Cited

FOREIGN PATENT DOCUMENTS

| JP | 05033980 A | * | 2/1993 |
|----|------------|---|--------|
| JP | 05256489 A | * | 10/1993 |
| JP | 06180136 A | * | 6/1994 |
| JP | 06300341 A | * | 10/1994 |
| JP | 8-86504 | | 4/1996 |
| JP | 08-094160 | | 4/1996 |
| JP | 8-285303 | | 11/1996 |
| JP | 10-205795 | | 8/1998 |
| JP | 10-205804 | | 8/1998 |
| JP | 10-292928 | | 11/1998 |
| JP | 11325035 A | * | 11/1999 |
| JP | 2004-77016 | | 3/2001 |
| JP | 2002-081733 | | 3/2002 |
| JP | 2002-333198 | | 11/2002 |
| JP | 2003-214696 | | 7/2003 |
| JP | 2005-156044 | | 6/2005 |
| JP | 2005-249328 | | 9/2005 |
| JP | 2006-017342 | | 1/2006 |
| JP | 2006-234278 | | 9/2006 |
| JP | 2007-10222 | | 1/2007 |
| JP | 2007-057182 | | 3/2007 |

OTHER PUBLICATIONS

Machine Language English Translation of JP 2005-249328, published Sep. 15, 2005.
English Language Abstract of JP 08-094160, published Apr. 12, 1996.
Machine Language English Translation of JP 08-094160, published Apr. 12, 1996.
English Language Abstract of JP 2004-077016, published Mar. 11, 2004.
Machine Language English Translation of JP 2004-077016, published Mar. 11, 2004.
English Language Abstract of JP 2003-214696, published Jul. 30, 2003.
Machine Language English Translation of JP 2003-214696, published Jul. 30, 2003.
International Search Report issued in PCT/JP2008-068819, dated Jan. 13, 2009.
Written Opinion issued in PCT/JP2008/068819, dated Jan. 13, 2009.
International Search Report issued in PCT/JP2008/065961, mailed Nov. 18, 2008.
English language abstract of JP 2007-10222, published Jan. 18, 2007.
Machine English language translation of JP 2007-10222, published Jan. 18, 2007.
English language abstract of JP 10-205804, published Aug. 4, 1998.
Machine English language translation of JP 10-205804, published Aug. 4, 1998.
English language abstract of JP 10-292928, published Nov. 4, 1998.
Machine English language translation of JP 10-292928, published Nov. 4, 1998.
English language abstract of JP 2006-017342, published Jan. 1, 2006.
Machine English language translation of JP 2006-017342, published Jan. 1, 2006.
U.S. Appl. No. 12/757,583, electronically captured on Jul. 31, 2012.
Japanese Office Action issued in JP 2009-538154 on Nov. 1, 2011.
English Translation of Japanese Office Action issued in JP 2009-538154 on Nov. 1, 2011.
English Language Abstract of JP 2002-333198 published Nov. 22, 2002.
English Language Translation of JP 2002-333198 published Nov. 22, 2002.
English Language Abstract of JP 2006-234278 published Sep. 7, 2006.
English Language Translation of JP 2006-234278 published Sep. 7, 2006.
English Language Abstract of JP 8-285303 published Nov. 1, 1996.
English Language Translation of JP 8-285303 published Nov. 1, 1996.
English Language Abstract of JP 60-191814 published Sep. 30, 1985.
English Language Abstract of JP 2005-156044 published Jun. 16, 2005.
English Language Translation of JP 2005-156044 published Jun. 16, 2005.
English Language Abstract of JP 8-86504 published Apr. 2, 1996.
English Language Translation of JP 8-86504 published Apr. 2, 1996.
English Language Abstract of JP 10-205795 published Aug. 4, 1998.
English Language Translation of JP 10-205795 published Aug. 4, 1998.
Japanese Office Action issued in JP 2009-538154 on Jun. 12, 2012.
English Language Translation of Japanese Office Action issued in JP 2009-538154 on Jun. 12, 2012.
English Language Abstract of JP2007-057182 published Mar. 8, 2007.
English Language Translation of JP2007-057182 published Mar. 8, 2007.
English Language Abstract of JP 2002-081733 published Mar. 22, 2002.
English Language Translation of JP 2002-081733 published Mar. 22, 2002.
U.S. Appl. No. 12/757,583, electronically captured on Nov. 30, 2012.
U.S. Appl. No. 12/757,583, electronically captured on Aug. 23, 2013.
U.S. Appl. No. 12/757,583, electronically captured on Mar. 19, 2013.
U.S. Appl. No. 12/757,583 electronically captured on Nov. 19, 2013 between Aug. 19, 2013 and Nov. 19, 2013.

* cited by examiner

CEILING-EMBEDDED AIR CONDITIONER

TECHNICAL FIELD

The present invention relates to an air conditioner specifically of a ceiling-embedded type, and more particularly, to a ceiling-embedded air conditioner having an improved mounting structure of a decorative panel.

BACKGROUND ART

Generally, a ceiling-embedded air conditioner has a structure in which a decorative panel covers a lower surface of an indoor unit body embedded in a ceiling.

In a conventional mounting structure of a decorative panel to an indoor unit body, a decorative panel is temporarily hung and then fastened to the indoor unit body by a fastening screw. Otherwise, a mounting screw member including an integrated fastening screw and a temporary hanging portion is provided on the decorative panel, and it is then hung on the indoor unit and fastened by a screw (for example, Patent Document 1: Japanese Patent Laid-Open No. 2006-17342).

However, as described in Patent Document 1, the method of fastening with the attached screw provide a problem that the screw falls or is lost, or the screw is fastened in alignment with a lower hole, which reduces workability. For the method of hanging and fastening, on the body, the mounting screw member including the fastening screw and the temporary hanging portion integral with each other and provided on the decorative panel, there is no risk of falling or loss of the screw but there is a problem in workability of temporary hanging.

DISCLOSURE OF THE INVENTION

The present invention was made in consideration of the circumstances mentioned above, and an object thereof is to provide an air conditioner of a ceiling-embedded type (ceiling-embedded air conditioner) in which a decorative panel can be easily mounted to an indoor unit body.

To achieve the above-described object, the present invention provides a ceiling-embedded air conditioner including: an indoor unit body embedded in a ceiling; and a decorative panel that covers a lower surface of the indoor unit body, in which a panel fastening screw that fastens the decorative panel to the indoor unit body is previously mounted to the indoor unit body and has a small diameter portion without a threaded portion at an intermediate portion thereof.

In a preferred embodiment, a panel fastening member that fastens the decorative panel is provided on the decorative panel so as to be advanceable and retractable, and the panel fastening member has a screw engaging groove that engages the panel fastening screw, and engages the panel fastening screw in an advanced state.

A hook may be provided on the decorative panel and a hook engaging portion with which the hook engages is provided on the indoor unit body in a manner such that the hook is engaged with the hook engaging portion to temporarily hang the decorative panel on the indoor unit body.

According to the present invention, a ceiling-embedded air conditioner that allows a decorative panel to be easily mounted to an indoor unit body can be provided.

BEST MODE FOR CARRYING OUT THE INVENTION

A ceiling-embedded air conditioner according to an embodiment of the present invention will be described with reference to the accompanying drawings.

Figure 1:
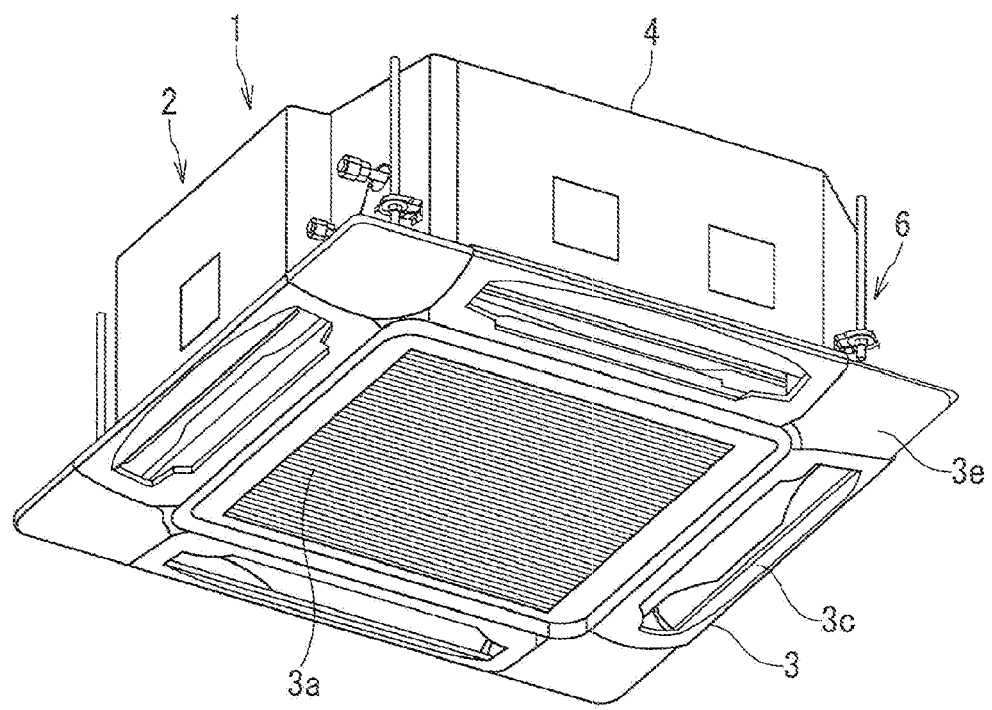
FIG. 1 is a perspective view of a ceiling-embedded air conditioner according to an embodiment of the present invention.
Figure 2:
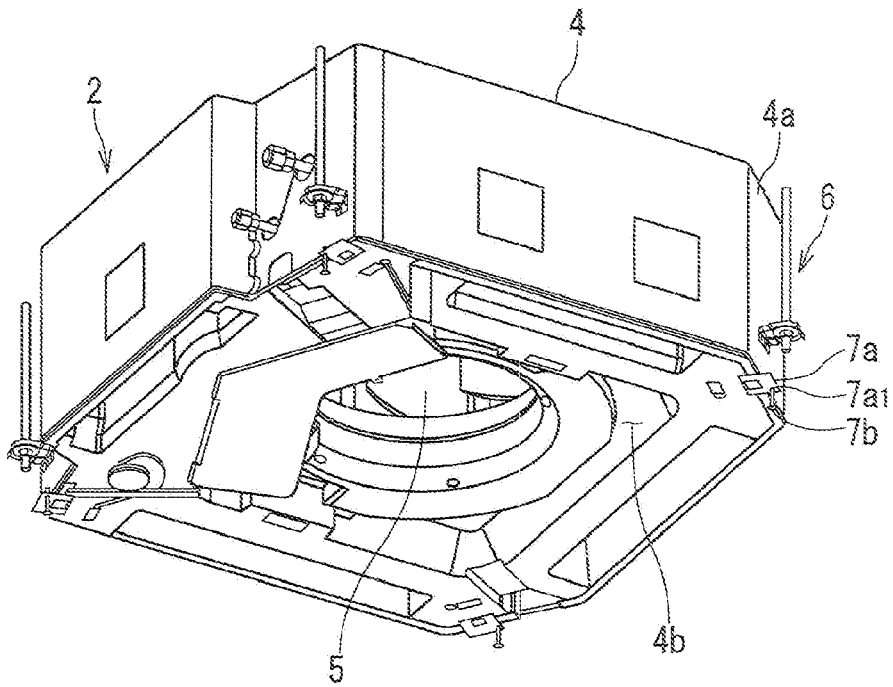
FIG. 2 is a perspective view of an indoor unit body of the ceiling-embedded air conditioner according to the embodiment of the present invention.

FIG. 1 is a perspective view of a ceiling-embedded air conditioner according to an embodiment of the present invention, and FIG. 2 is a perspective view of an indoor unit body of the ceiling-embedded air conditioner.

As shown in FIGS. 1 and 2, the ceiling-embedded air conditioner 1 according to the embodiment of the present invention includes an indoor unit body 2 embedded in a ceiling and a decorative panel 3 that covers a lower surface of the indoor unit body 2.

The indoor unit body 2 includes a housing 4, which houses an indoor heat exchanger, not shown, an indoor blower 5 and the like.

The housing 4 is suspended from and mounted to a ceiling substrate, not shown, by means of four sets of similar suspending units 6.

Figure 3:
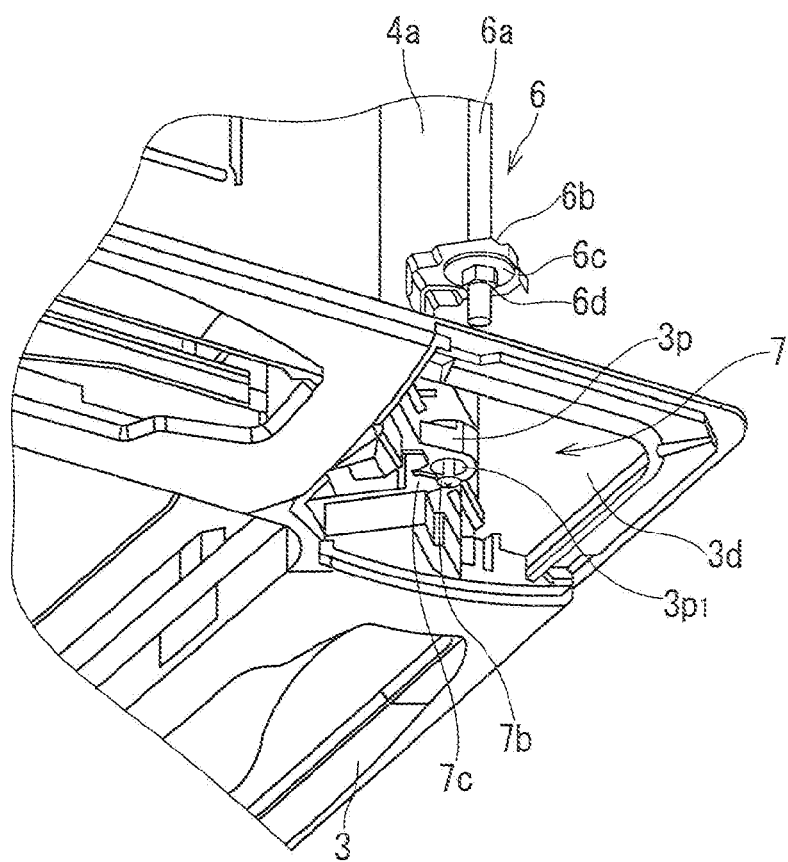
FIG. 3 is a partially enlarged perspective view of a panel fastening member, in a retracted state, used for mounting a decorative panel of the ceiling-embedded air conditioner according to the embodiment of the present invention.

As shown in an enlarged manner in FIG. 3, each of the suspending units 6 includes a suspending bolt 6a mounted to the ceiling substrate, a suspending fitting 6b mounted to one side wall 4a of the housing 4, an unshown upper-side washer and a lower-side washer 6c that vertically hold the suspending fitting 6b therebetween and through which the suspending bolt 6a passes, and an upper nut and a lower nut 6d that are threaded with the suspending bolt 6a and vertically hold the suspending fitting 6b therebetween.

Meanwhile, the decorative panel 3 includes an air inlet port 3b having an inlet grill 3a removably mounted to the central portion of the panel 3, air outlet ports 3c provided in four peripheral sides, and decorative plates 3e that are provided at four corners so as to close openings 3d. The decorative panel 3 is also mounted to the housing 4 by a mounting unit 7 so as to close a lower surface of the indoor unit body 2, that is, an opening portion 4b of the housing 4.

The mounting unit 7 is fastened to the indoor unit body 2, for example, the opening portion 4b of the housing 4, and includes a mounting piece 7a having a screw hole $7a_1$, a panel fastening screw 7b threaded into the screw hole $7a_1$, a screw through hole $3p_1$ provided in a panel fastening portion 3p and through which a head portion $7b_1$ of the panel fastening screw 7b passes, and a panel fastening member 7c mounted to the decorative panel 3 so as to be advanceable and retractable.

Figure 4:
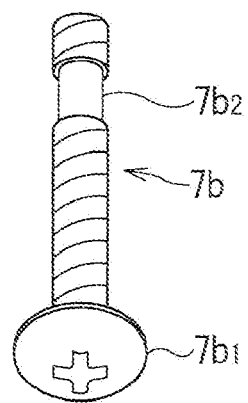
FIG. 4 is a perspective view of the panel fastening screw used in the ceiling-embedded air conditioner according to the embodiment of the present invention.

As shown in FIG. 4, the panel fastening screw 7b has, near a tip end, a middle portion, that is, a head portion $7b_1$ and a small diameter portion $7b_2$ having no thread between the head portion $7b_1$ and the tip. When the panel fastening screw 7b threaded into the screw hole $7a_1$ is rotated counterclockwise between the small diameter portion $7b_2$ and the head portion $7b_1$, the panel fastening screw 7b is moved down along a screw groove, but when the small diameter portion $7b_2$ reaches the screw hole $7a_1$, threading is released and the panel fastening screw 7b is no longer moved down, thereby preventing falling of the panel fastening screw 7b.

Figure 5:
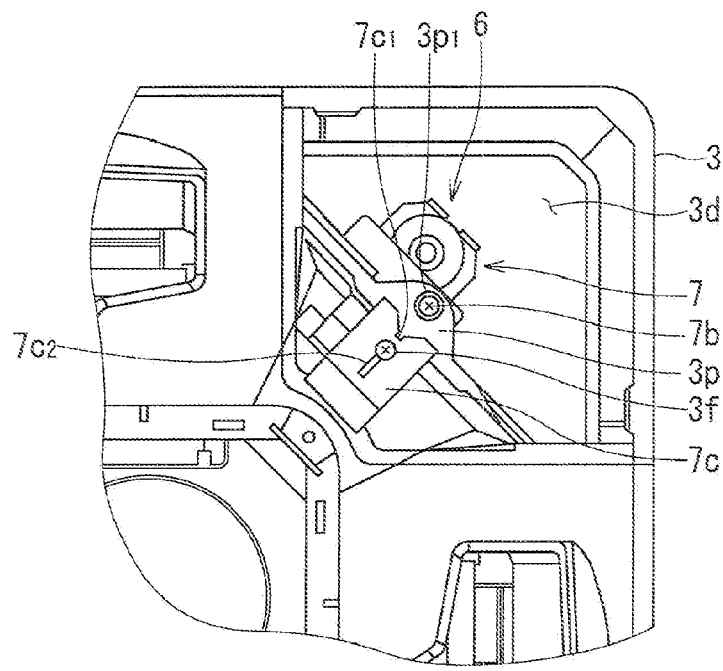
FIG. 5 is a partially enlarged plan view of the panel fastening member, in the retracted state, used in the ceiling-embedded air conditioner according to the embodiment of the present invention.
Figure 6:
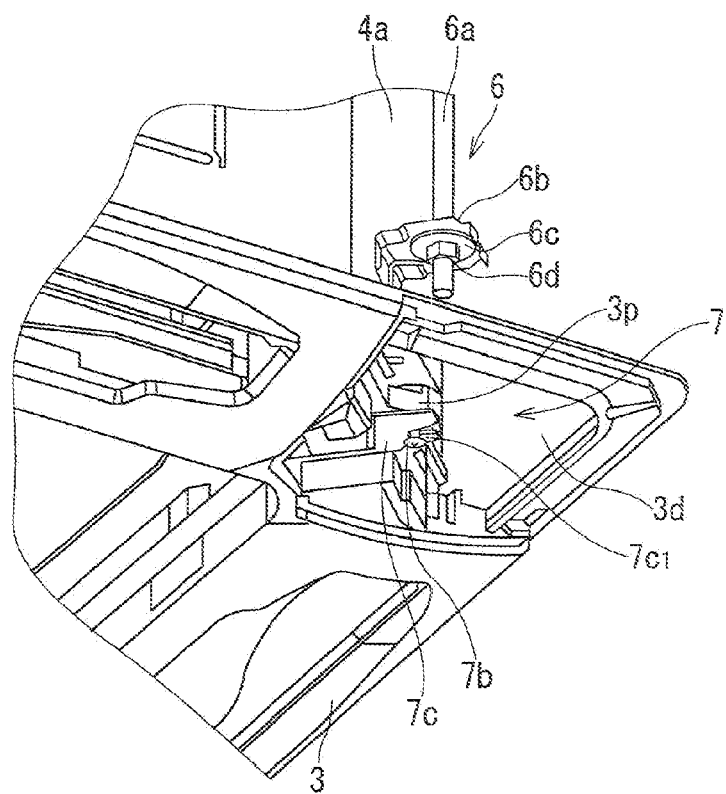
FIG. 6 is a partially enlarged perspective view of the panel fastening member, in an advanced state, used for mounting the decorative panel of the ceiling-embedded air conditioner according to the embodiment of the present invention.
Figure 7:
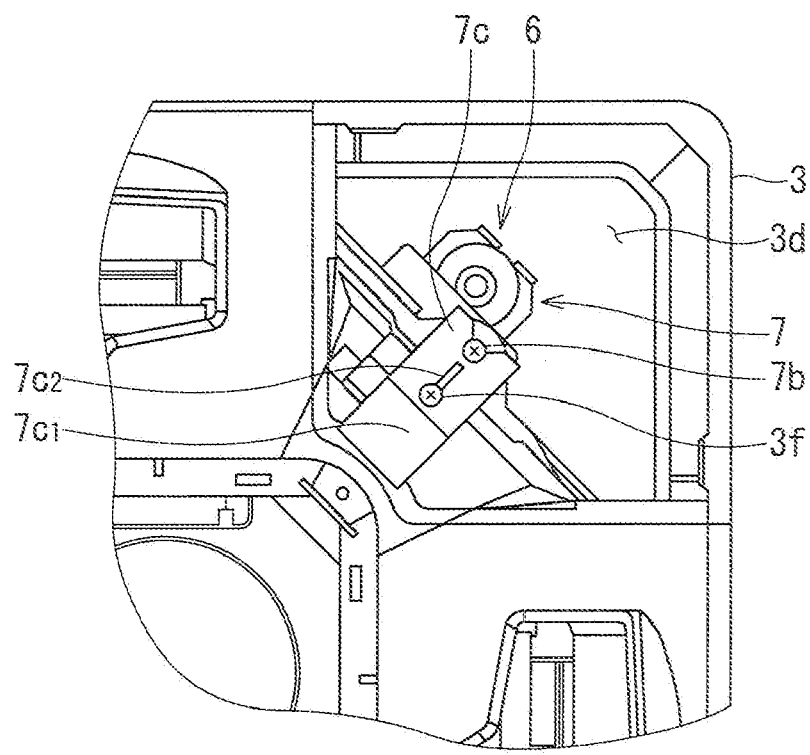
FIG. 7 is a partially enlarged plan view of the panel fastening member, in the advanced state, used in the ceiling-embedded air conditioner according to the embodiment of the present invention.

FIGS. 3 and 5 show a retracted (standby) state of the panel fastening member 7c, and FIGS. 6 and 7 show an advanced (engaged) state of the panel fastening member 7c. For example, as shown in FIG. 5, the panel fastening member 7c has a rectangular plate shape and includes a Y-shaped screw engaging groove $7c_1$ formed at a tip end portion thereof and a guide groove $7c_2$ formed near the central portion thereof. The panel fastening member 7c is mounted to the decorative panel 3 so as to be advanceable and retractable by a fastening screw 3f passing through the guide groove $7c_2$.

Further, as shown in FIGS. 3 and 5, the panel fastening member 7c is advanced from the retracted state toward (i.e., moved forward and rearward) the panel fastening portion 3p provided at the corner portion of the decorative panel 3, and as shown in FIGS. 6 and 7, the screw engaging groove $7c_1$ engages the panel fastening screw 7b passing through the screw through hole $3p_1$ provided in the panel fastening portion 3p, and is fastened by the panel fastening screw 7b. Thus, the decorative panel 3 is mounted to the housing 4, and the panel fastening member 7c acts to position the decorative panel 3 and functions as a washer.

Figure 8:
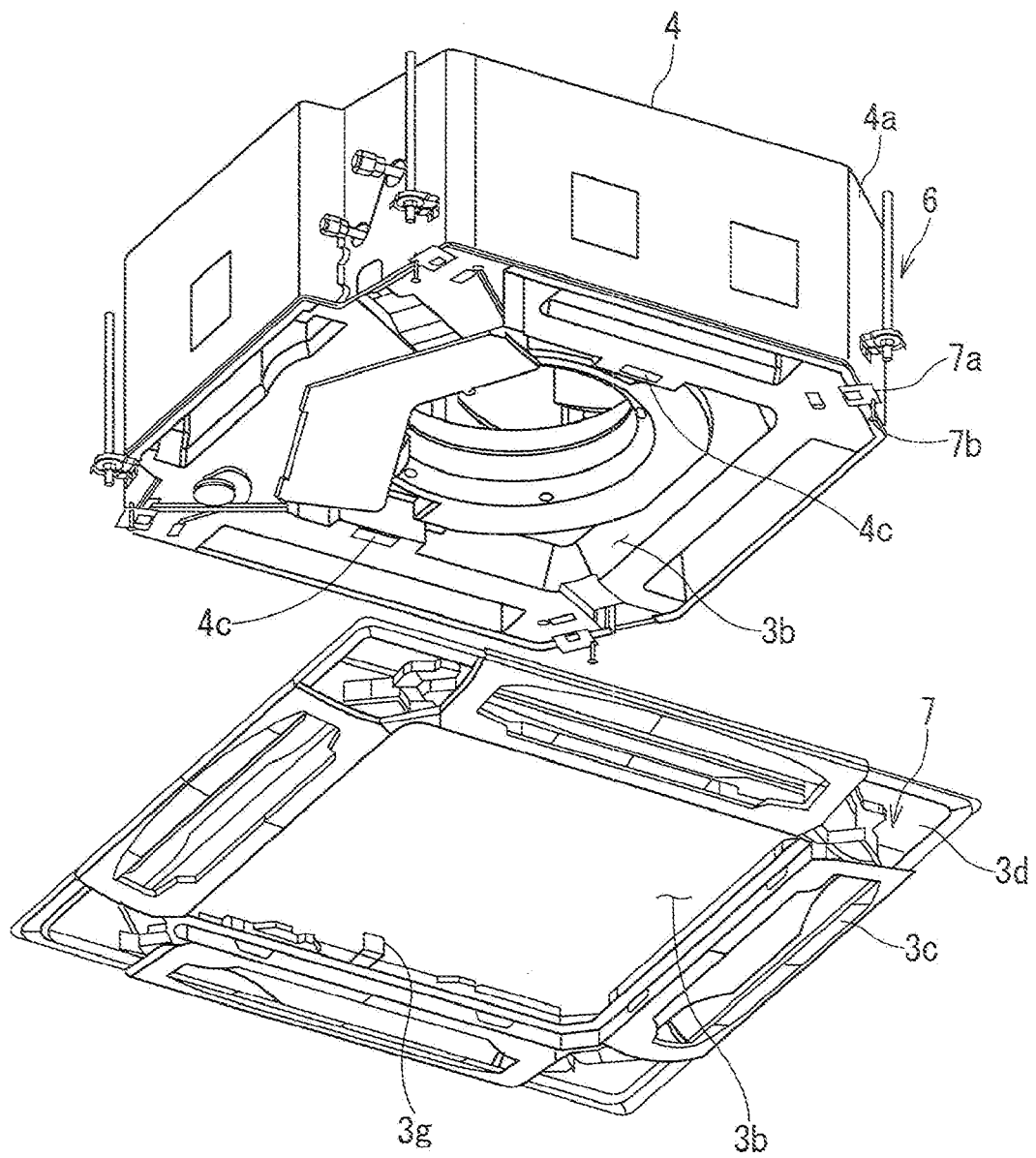
FIG. 8 is a perspective view of the decorative panel, before mounting, of the ceiling-embedded air conditioner according to the embodiment of the present invention.
Figure 9:
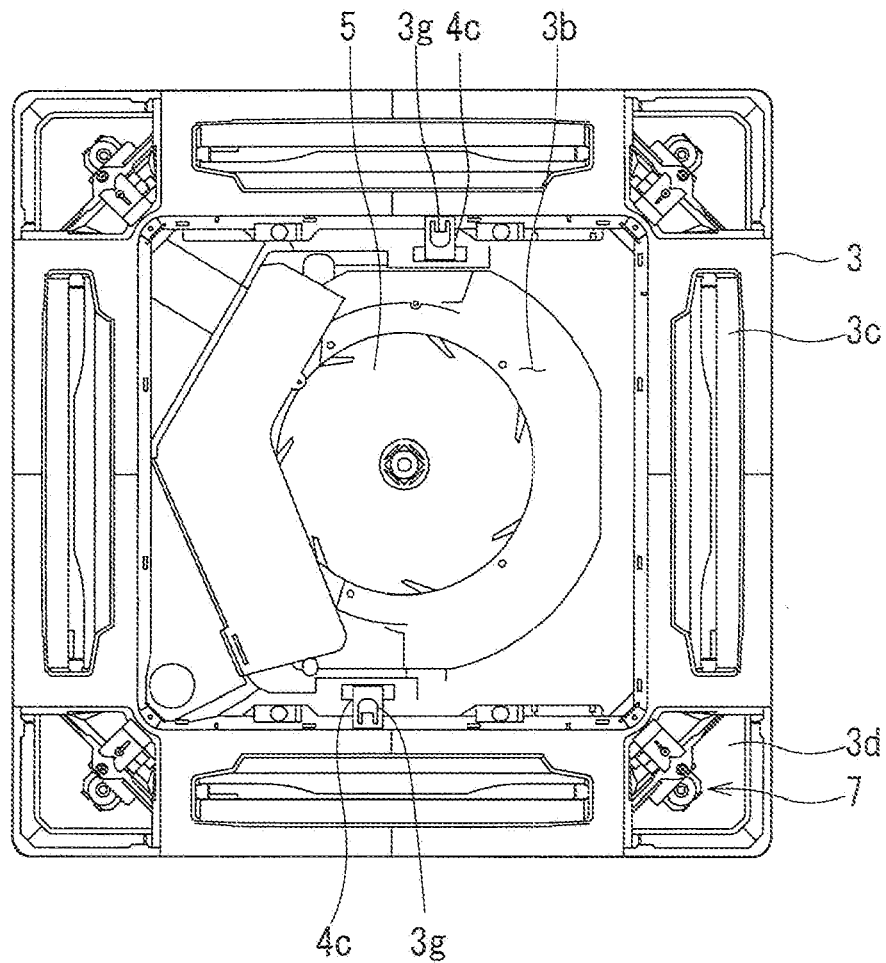
FIG. 9 is a plan view of the decorative panel, after mounting, of the ceiling-embedded air conditioner according to the embodiment of the present invention.

As shown in FIGS. 8 and 9, temporary hanging hooks 3g, 3g are provided on opposite sides of the air inlet port 3b of the decorative panel 3, and two hook engaging portions 4c, 4c are provided in substantially opposite positions corresponding to the hooks 3g, 3g on lower portions of opposite inner walls of the housing 4.

Figure 10:
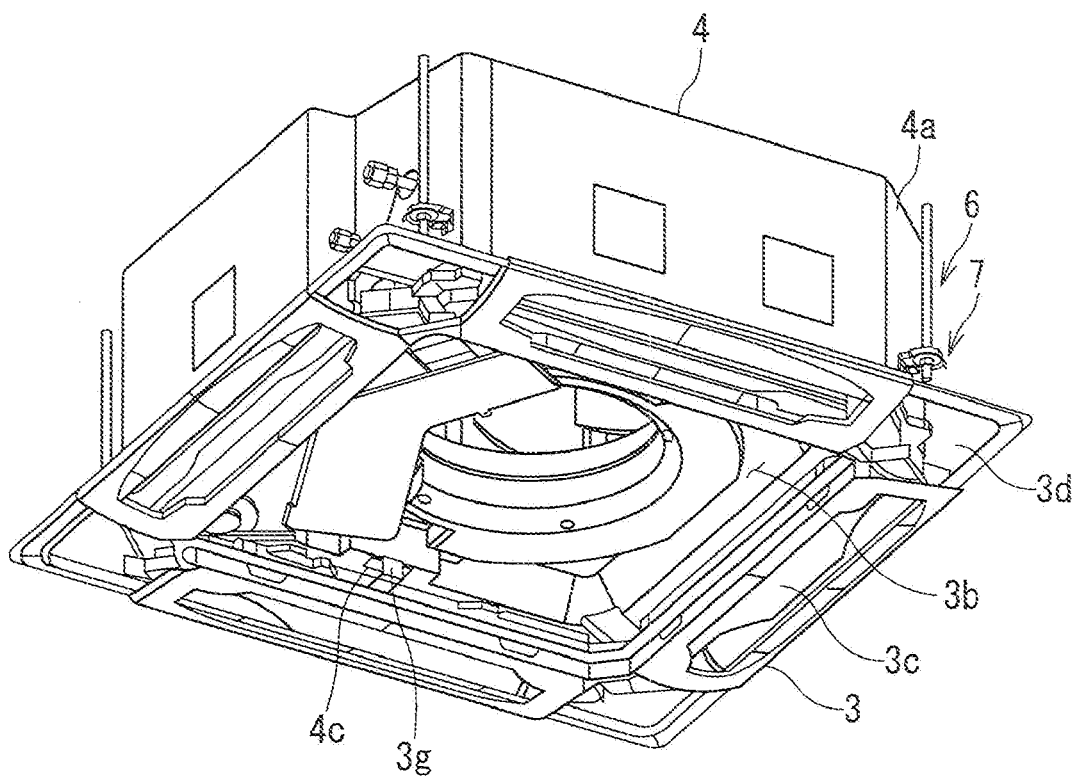
FIG. 10 is a perspective view of the decorative panel, after mounting, of the ceiling-embedded air conditioner according to the embodiment of the present invention.

As shown in FIGS. 9 and 10, the hooks 3g, 3g are engaged with the hook engaging portions 4c and 4c, so that the decorative panel 3 is temporarily hung on the housing 4.

The decorative panel 3 is mounted to the housing 4 using the mounting unit 7 in the following manner.

As shown in FIG. 2, the housing 4 with the panel fastening screw 7b previously mounted to the mounting piece 7a is suspended from the ceiling substrate using the suspending unit 6.

As shown in FIG. 8, with the inlet grill 3a and the decorative plate 3e previously removed, the air inlet port 3b and the operation opening 3d are opened.

As shown in FIGS. 9 and 10, the hooks 3g, 3g are engaged with the hook engaging portions 4c and 4c, and thus, the decorative panel 3 is temporarily hung on the housing 4.

As shown in FIGS. 4 and 5, in a state in which the decorative panel 3 is temporarily hung on the housing 4, the panel fastening member 7c is in the retracted state. In this state, the panel fastening screw 7b passes through the screw through hole $3p_1$ provided in the panel fastening portion 3p, and the screw head portion and a portion near the screw head portion is exposed outside of the screw through hole $3p_1$.

As shown in FIGS. 6 and 7, the panel fastening member 7c is advanced and engaged with the panel fastening screw 7b passing through the screw through hole $3p_1$ in the panel fastening portion 3p, and thereafter, the panel fastening member 7c is fixedly positioned by the fastening screw 3f, and the panel fastening screw 7b is then fastened. According to this manner, the panel fastening member 7c is held between the panel fastening portion 3p and the head portion $7b_1$ of the panel fastening screw 7b.

As shown in FIG. 1, the inlet grill 3a and the decorative plate 3e are mounted to close the air inlet port 3b and the operation opening 3d.

According to the procedure mentioned above, the mounting of the decorative panel 3 to the housing 4 has been completed.

In the above-described mounting process of the decorative panel, since the panel fastening screw is mounted to the housing, there is no risk of loss of the panel fastening screw. In addition, when the panel fastening screw is fastened, since there is no need to align the panel fastening screw with the screw hole, good workability may be provided.

Further, the decorative panel can be positioned by a simple operation of passing the head portion of the panel fastening screw through the screw through hole in the panel fastening portion and then advancing the panel fastening member, and therefore, the decorative panel can be mounted to a proper position only by fastening the panel fastening screw, thus also providing good workability.

Furthermore, since the panel fastening member is engaged with the panel fastening screw and held between the panel fastening portion and the head portion of the panel fastening screw, the decorative panel can be easily positioned and the panel fastening member functions as a washer.

Still furthermore, the decorative panel is temporarily hung on the housing by using the hook and the hook engaging portion, and the decorative panel is mounted by the panel fastening member and the panel fastening screw, so that the mounting workability can be improved.

Still furthermore, when it is required to remove the decorative panel for the purpose of maintenance or the like, the panel fastening screw does not drop off the housing even if the panel fastening screw is excessively loosened, thus also providing good workability.

The invention claimed is:

1. A ceiling-embedded air conditioner comprising:
an indoor unit body embedded in a ceiling;
a decorative panel that covers a lower surface of the indoor unit body and having a hook there on;
a panel fastening screw mounted to the-indoor unit body and comprising at least two threaded portions and a small diameter portion without a threaded portion in an intermediate portion between two threaded portions, the panel fastening screw fastening the decorative panel to the indoor unit body; and
a panel fastening member provided on and slidably coupled to the decorative panel, the panel fastening member sliding translationally in a direction generally parallel to the decorative panel so as to be advanced and retracted, the panel fastening member comprising a screw engaging groove that engages the panel fastening screw in an advanced state and does not engage the panel fastening screw in a retracted state.

2. The ceiling-embedded air conditioner according to claim 1, further comprising:
a hook engaging portion provided on the indoor unit body, the hook being configured to engage with the hook engaging portion to temporarily hang the decorative panel on the indoor unit body.

* * * * *